United States Patent Office 3,590,029
Patented June 29, 1971

3,590,029
2-AMINO-ADENOSINE DERIVATIVES
Klaus Koch, Mannheim-Feudenheim, Erich Fauland and Kurt Stach, Mannheim-Waldhof, Max Thiel, Mannheim, and Wolfgang Schaumann and Karl Dietmann, Mannheim-Waldhof, Germany, assignors to Boehringer Mannheim Gesellschaft mit beschrankter Haftung, Mannheim-Waldhof, Germany
No Drawing. Filed Aug. 22, 1968, Ser. No. 754,745
Claims priority, application Germany, Aug. 25, 1967,
B 94,161
Int. Cl. C07d 51/54
U.S. Cl. 260—211.5           7 Claims

ABSTRACT OF THE DISCLOSURE

Novel 2-amino-adenosine derivatives characterized by cardiac and circulatory activity and by their high coronary specificity having the following structural formula:

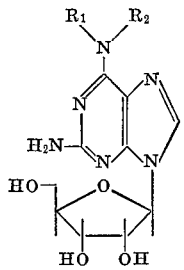

wherein $R_1$ is hydrogen, a substituted or unsubstituded, saturated or unsaturated, straight or branched chain aliphatic hydrocarbon radical, wherein said substituent is at least one of amino, alkylamino, dialkylamino, acylamino, alkoxy, acyloxy, hydroxy, mercapto, alkylmercapto, carboxy, carboxy alkyl or carboxamido and $R_2$ is a saturated or unsaturated cycloalkyl radical which can carry endoalkylene radicals or annellated, saturated or unsaturated cyclic aliphatic hydrocarbon radicals or is the group A—X—B, wherein A is a substituted or unsubstituted, saturated or unsaturated, straight or branched chain, or cyclic aliphatic hydrocarbon radical, wherein said substituent is at least one of hydroxy, acyloxy, carboxy and aryl radicals, X is a valency bond, an oxygen or sulfur atom, alkylated imino or acylated imino, and B is a substituted or unsubstituted alkyl, alkenyl, aryl, furyl, pyridyl, indolyl or imidazolyl radical, wherein said substituent is at least one of halogen, alkyl, haloalkyl, alkoxy, aryloxy, acyloxy, hydroxy, mercapto, alkylmercapto, nitro, carboxy, carboxyalkyl and methylsulfonylamino radicals.

The present invention relates to adenosine derivatives and more particularly to 2-amino-adenosine derivatives, therapeutic compositions containing such derivatives as active ingredient and to method of using such adenosine derivatives.

The novel 2-amino-adenosine derivatives according to the present invention are compounds of the formula:

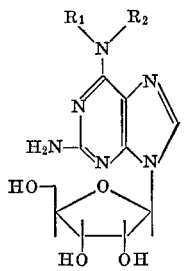

wherein $R_1$ is hydrogen, saturated or unsaturated, straight chain or branched aliphatic hydrocarbyl radical, which can be substituted by one or more of amino, alkylamino, dialkylamino, acylamino, alkoxy, acyloxy, hydroxy, mercapto, alkylmercapto, carboxy, carboxyalkyl and carboxamido and $R_2$ is saturated or unsaturated cycloalkyl, which can carry endoalkylene, or annellated, saturated or unsaturated cyclic aliphatichydrocarbon radicals, or is the group A—X—B, in which A is saturated or unsaturated, straight chain or branched or cyclic aliphatic hydrocarbonyl, which can be substituted by one or more of hydroxy, acyloxy, carboxy, or aryl, X is a valency bond, an oxygen or sulfur atom, alkylated or acylated imino and B is alkyl, alkenyl, aryl, furyl, pyridyl, indolyl or imidazolyl, which can be substituted by one or more of halogen, alkyl, haloalkyl, alkoxy, aryloxy, acyloxy, hydroxyl, mercapto, alkylmercapto, nitro, carboxy, carboxylalkyl and methylsulfonylamino.

In accordance with the invention, it has now been found that the adenosine derivatives exhibit particularly interesting cardiac and circulatory pharmacological activities and are characterized by their high coronary specificity.

The new compounds according to the present invention can be prepared, for example, by reacting a purine riboside of the following formula:

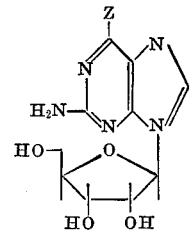
(II)

wherein Z is halogen or a reactive mercapto group, with an amine of the formula:

(III)

wherein $R_1$ and $R_2$ have the same above designated meanings, or by reductively decomposing a compound of the formula:

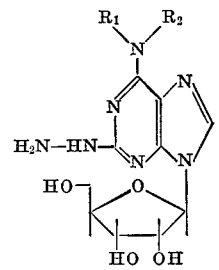
(IV)

wherein $R_1$ and $R_2$ have the above designated meanings, or, in the case of the preparation of a compound having Formula I in which $R_1$ is hydrogen, by reductively decomposing a compound of the formula:

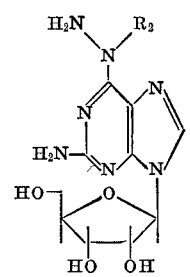
(V)

wherein $R_2$ has the above set out meaning.

In carrying out the above-described methods of preparation, the hydroxyl groups in the ribose residue can, if desired, be temporarily blocked by groups which can thereafter be easily split off.

The reaction of the purine-ribosides (II) with the amines (III) is carried out in an inert solvent, as for example, n-propanol, isopropanol, butanol, tetrahydrofuran or dioxan, preferably in the presence of a tertiary amine, such as for example, triethylamine, at ambient temperature or at a slightly elevated temperature.

The reductive decomposition of the compounds (IV) and (V) is preferably carried out by boiling with an active nickel catalyst, such as Raney nickel, in an alcohol such as for example, methanol, ethanol, n-propanol or isopropanol.

The purine-ribosides (II) used as starting materials in which Z is halogen are described, for example, in J. Org. Chem., 28, 945/1963; and compounds (II) in which Z is mercapto are known from Chem. Pharm. Bull., 12, 951/1964.

The compounds (IV) used as starting materials can be prepared by the reaction of the corresponding 2-chloro-compounds with hydrazine (see J.A.C.S., 80, 3742/1958). The 2-chloro compounds can be prepared by the method described in U.S. patent application Ser. No. 691,124, filed Dec. 18, 1967.

The compounds (V) used as starting materials can be obtained, for example, by the reaction of a purine-riboside (II) with a hydrazine of the formula:

$$H_2N\text{---}NH\text{---}R_2 \qquad (VI)$$

in which $R_2$ has the above-designated meaning. The hydrazines (VI) generally react more quickly and more easily with compounds (II) than the amines (III) so that the round-about way via the compounds (V) can be advantageous (see Chem. Pharm. Bull., loc. cit.).

If it is desired temporarily to block the hydroxyl groups of the ribose residue, then there can be used the protective groups which are conventional in sugar chemistry. For this purpose, there can be considered acyl groups, preferably acetyl or benzoyl or there can be used ketals, as for example, the 2′,3′-isopropylidene compounds, which, after the condensation reaction has taken place, can easily be converted into the free 2′,3′-dihydroxy compounds by the action of acids. If, however, acyl radicals are used as protective groups, then these can be split off with the use of alkalis.

The following examples are given for the purpose of illustrating the present invention and are in nowise to be construed as being limitative thereof.

EXAMPLE 1

N(6)-benzyl-2-amino-adenosine 5.0 g. (14.4 mM.) 2-amino-6-bromonebularin were boiled under reflux for 3 hours in admixture with 1.71 g. (15.85 mM.) benzylamine and 2.92 g. (28.8 mM.) triethylamine in 50 ml. isopropanol. Following cooling of the reaction mixture, the precipitated triethylamine hydrobromide was filtered off using suction, thoroughly washed with isopropanol and the filtrate evaporated under vacuum. The oily residue thereby obtained was digested twice with 50 ml. amounts of chloroform. Insoluble material was filtered off with suction and washed with chloroform. For purification, a solution of the substance in 50 ml. dimethyl formamide was added dropwise, with efficient stirring, to 500 ml. ether. The precipitate formed was filtered off using suction, thoroughly washed with ether and dried. There were thusly obtained 1.5 g. (29% of theory) N(6)-benzyl-2-amino-adenosine, having a melting point of 92° C. (decomp.).

EXAMPLE 2

N(6)-n-propyl-2-amino-adenosine

Using a procedure analogous to that described in Example 1, 6.9 g. (20 mM.) 2-amino-6-bromonebularin were reacted with 1.32 g. (22 mM.) n-propylamine and 4.0 g. (40 mM.) triethylamine. The product obtained after evaporation of the reaction solution was purified by preparative thin layer chromatography on silica gel plates using chloroformmethanol (6:1). There were obtained 3.2 g. (57% of theory) N(6)-n-propyl-2-amino-adenosine, having a melting point of 98° C. (decomp.).

EXAMPLE 3

N(6)-(L-β-phenyl-propyl)-2-amino-adenosine

A procedure analogous to that described in Example 1 was followed and from 9.5 g. (27.5 mM.) 2-amino-6-bromonebularin, 4.1 g. (30.3 mM.) L-(—)-β-amino-phenyl-propane and 5.55 g. (55 mM.) triethylamine there was obtained a crude product which, after purification by the method described in Example 2, i.e., preparative thin layer chromatography, there were recovered 2.8 g. (25% of theory) N(6)-(L-β-phenyl-propyl)-2-amino-adenosine, having a melting point of 90° C.

EXAMPLE 4

N(6)-(2-chlorobenzyl)-2-amino-adenosine

Variant a.—A procedure analogous to that described in Example 1 was followed and from 6.92 g. (20 mM.) 2-amino-6-bromonebularin, 3.1 g. (22 mM.) 2-chlorobenzylamine and 4 g. (40 mM.) triethylamine, there was obtained a crude product which, following recrystallization from chloroform, yielded 2.0 g. (25% of theory) N(6)-(2-chlorobenzyl)-6-amino-adenosine, having a melting point of 142° C.

Variant b.—8.3 g. (19.45 mM.) 2′,3′,5′-tri-O-acetyl-2-amino-6-chloronebularin were boiled under reflux for 4 hours in 50 ml. isopropanol with 3.0 g.) 21.2 mM.) 2-chlorobenzylamine and 3.97 g. (38.9 mM.) triethylamine. Following cooling of the reaction mixture, the precipitated triethylamine hydrochloride was filtered off using suction, thoroughly washed and the filtrate evaporated under vacuum. The residue was taken up with 100 ml. of methanol which had been saturated with ammonia and allowed to stand overnight at ambient temperature. The following day, the solvent was removed under vacuum and the residue recrystallized, with the addition of activated charcoal, from chloroform. There were thusly obtained 2.7 g. (34% of theory) N(6)-(2-chlorobenzyl)-2-amino-adenosine having a melting point of 138° C.

EXAMPLE 5

N(6)-isobutyl-2-amino-adenosine

Following a procedure analogous to that described in Example 1, 5.2 g. (15 mM.) 2-amino-6-bromonebularin were reacted with 1.2 g. (16.5 mM.) isobutylamine and 3.0 g. (30 mM.) triethylamine. The crude product which was obtained was purified by preparative thin layer chromatography by the method described in Example 2 to yield 2.9 g. (5777% of theory) N(6)2isobutyl-2-amino-adenosine, which had a melting point of 75° C.

EXAMPLE 6

N(6)-(2-methyl-benzyl)-2-amino-adenosine

In a procedure analogous to that described in Example 1, 5.2 g. (15 mM.) 2-amino-6-bromonebularin were reacted with 2.0 g. (16.5 mM.) 2-methyl-benzylamine in the presence of 3.0 g. (30 mN.) triethylamine. Following the working up of the reaction mixture in the conventional manner, the crystalline compound obtained was recrystallized from isopropanol. There were thusly obtained 2.3 g. (40% of theory) N(6)-(2-methyl-benzyl)-2-amino-adenosine, having a melting point of 185–187° C.

EXAMPLE 7

N(6)-(2-trifluoromethyl-benzyl)-2-amino-adenosine

Using a method analogous to that described in Example 1, 3.8 g. (10.95 mM.) 2-amino-6-bromonebularin were reacted with 2.1 g. (12.0 mM.) 2-trifluoromethyl-benzylamine and 2.2 g. (22 mM.) triethylamine. Following recrystallization of the crude product from isopropanol, there were obtained 1.8 g. (37% of theory) N(6)-(2-trifluoromethyl-benzyl)-2-amino-adenosine which had a melting point of 175–177° C.

EXAMPLE 8

N(6)-furfuryl-2-amino-adenosine

Following a prfocedure analogous to that described in Example 1, from 5.2 g. (15 mM.) 2-amino-6-bromonebularin, 1.6 g. (16.5 mM.) furfurylamine and 3.0 g. (30 mM.) triethylamine, there was obtained a crude product which, after recrystallization from water, yielded 0.9 g. (16% of theory) N(6)-furfuryl-2-amino-adenosine having a melting point of 125–127° C.

EXAMPLE 9

N(6)-(3,4-dimethoxy-β-phenethyl)-2-amino-adenosine

By a procedure analogous to that described in Example 1, starting from 5.2 g. (15 mM.) 2-amino-6-bromonebularin, 3.0 g. (16.5 mM.) 3,4-dimethoxy-β-phenethylamine and 3.0 g. (30 mM.) triethylamine, there were obtained 1.3 g. (19% of theory) N(6)-(3,4-dimethoxy-β-phenethyl)-2-amino-adenosine, which had a melting point of 90° C. (decomp.).

EXAMPLE 10

N(6)-(α-methyl-β-hydroxy-β-phenethyl)-2-amino-adenosine

Using a procedure analogous to that described in Example 1, 5.2 g. (15 mM.) 2-amino-6-bromonebularin 2.5 g. (16.5 mM.) L-norpseudoephedrine and 3.0 g. (30 mM.) triethylamine were reacted in 35 ml. isopropanol. Following the working up of the reaction mixture in the conventional manner, there was obtained 1.0 g. (16% of theory) N(6)-(α - methyl-β-hydroxy-β-phenethyl) - 2 - amino-adenosine, which had a melting point of 70° C. (decomp.).

EXAMPLE 11

N(6)-(α-carboxy-benzyl)-2-amino-adenosine 5.2 g. (15 mM.) 2-amino-6-bromonebularin, 2.75 g. (16.5 mM.) L-phenyl-alanine and 3.0 g. (30 mM.) triethylamine were boiled under reflux for 5.5 hours in a mixture of 35 ml. isopropanol and 15 ml. water. After working up the reaction mixture in the conventional manner, followed by purification by preparative thin layer chromatography by the procedure described in Example 2, there was obtained 0.9 g. (11% of theory) N(6)-(α-carboxy-benzyl)-2-amino-adenosine in the form of the triethylammonium salt; the salt had a melting point of 100° C. (decomp.).

EXAMPLE 12

N(6)-allyl-2-amino-adenosine 7.8 g. (22.5 mM.) 2-amino-6-bromonebularin and 1.43 g. (23.8 mM.) allylamine were reacted in the presence of 4.5 g. (45 mM.) triethylamine and the reaction mixture worked up and purified by the method described in Example 2. There were thusly obtained 3.7 g. (51% of theory) N(6)-allyl-2-amino-adenosine, which had a melting point of 140–144° C.

EXAMPLE 13

N(6)-cyclohexyl-2-amino-adenosine 5.2 g. (15 mM.) 2-amino-6-bromonebularin, 1.64 g. (16.5 mM.) cyclohexylamine and 3.0 g. (30 mM.) triethylamine were reacted by the method described in Example 1. Following the working up of the reaction mixture, there were obtained 1.4 g. (26% of theory) N(6)-cyclohexyl-2-amino-adenosine, which had a melting point of 154–156° C.

EXAMPLE 14

N(6)-(2-hydroxy-3-m-cresoxy-propyl)-2-amino-adenosine

A procedure analogous to that described in Example 1 was followed and 5.2 g. (15 mM.) 2-amino-6-bromonebularin were reacted with 3.0 g. (16.5 mM.) 2-hydroxy-3-m-cresoxy-propylamine in the presence of 3.0 g. (30 mM.) triethylamine in 35 ml. isopropanol. After working up the reaction mixture and thin layer chromatographic purification, there were obtained 1.4 g. (21% of theory) N(6)-(2-hydroxy-3-m-cresoxy-propyl)-2-amino-adenosine which had a melting point of 70° C. (decomp.).

EXAMPLE 15

N(6)-(2-phenyl-cyclopropyl)-2-amino-adenosine 5.2 g. (15 mM.) 2-amino-6-bromonebularin, 1.97 g. (16.5 mM.) 2-phenyl-cyclopropylamine and 3.0 g. (30 mM.) triethylamine were reacted by a method analogous to that described in Example 1. Following working up and purification, there were obtained 2.1 g. (35% of theory) N(6) - (2-phenyl-cyclopropyl)-2-amino-adenosine, which had a melting point of 102° C.

EXAMPLE 16

N(6)-(1-adamantyl)-2-amino-adenosine 5.2 g. (15 mM.) 2-amino-6-bromonebularin, 2.5 g. (16.5 mM.) 1-amino-adamantane and 3.0 g. (30 mM.) triethylamine were boiled under reflux for 8 hours in 50 ml. n-butanol. The solvent was then separated off under vacuum and the residue taken up in water and extracted several times with ethyl acetate. Upon evaporation of this extract, there was obtained a crystalline slurry which, after recrystallization from alcohol/water, yielded 1.4 g. (22% of theory) N(6)-(1-adamantyl)-2-amino-adenosine, which had a melting point of 247° C.

EXAMPLE 17

N(6)-(2-β-indolyl-ethyl)-2-amino-adenosine

By the method analogous to that described in Example 1, 5.2 g. (15 mM.) 2-amino-6-bromonebularin were reacted with 3.25 g. (16.5 mM.) tryptamine hydrochloride in the presence of 4.5 g. (45 mM.) triethylamine. Following the working up of the reaction mixture, there were obtained 2.8 g. (44% of theory) N(6)-(2-β-indolyl-ethyl)-2-amino-adenosine, which had a melting point of 78° C. (decomp.).

EXAMPLE 18

N(6)-(2-indanyl)-2-amino-adenosine 5.2 g. (15 mM.) 2-amino-6-bromonebularin, 2.2 g. (16.5 mM.) 2-amino-indane and 3.0 g. (30 mM.) triethylamine were reacted by a method analogous to that described in Example 1. After the working up of the reaction mixture and recrystallization from methanol, there were obtained 1.3 g. (22% of theory) N(6)-(2-indanyl)-2-amino-adenosine, which had a melting point of 140–143° C.

EXAMPLE 19

N(6)-n-butyl-2-amino-adenosine 4.3 g. (10 mM.) 2-amino-6-chloro-2',3',5'-tri-O-acetyl-nebularin (J. Org. Chem., 28, 946/1963), 1.0 g. (13.7 mM.) n-butylamine and 2.0 g. (20 mM.) triethylamine were heated under reflux for 4 hours in 50 ml. isopropanol. After cooling, the reaction mixture was mixed with 300 ml. ether, the precipitated triethylamine hydrochloride filtered off with suction and the filtrate evaporated. The residue was then taken up in 50 ml. 25% methanolic ammonia solution and allowed to stand for 12 hours at ambient temperature. The ammonia-methanol mixture was thereafter distilled off, the residue taken up in pure methanol and purified with activated charcoal.

The syrup which was obtained after evaporation of the methanol yielded, upon treatment with ether, 1.64 g. (48.5% of theory) of amorphous N(6)-n-butyl-2-amino-adenosine, which had a melting point of 80° C.

EXAMPLE 20

N(6)-benzhydryl-2-amino-adenosine

By a procedure analogous to that described in Example 1, 5.2 g. (15 mM.) 2-amino-6-bromonebularin were reacted with 3.0 g. (16.5 mM.) benzhydrylamine in the presence of 3.0 g. (30 mM. triethylamine in 35 ml. isopropanol. After working up the reaction mixture and reprecipitation from ether, there was obtained 1.0 g. (15% of theory) N(6)-benzhydryl-2-amino-adenosine, which had a melting point of 209–212° C.

EXAMPLE 21

N(6)-(2,4-dichlorobenzyl)-2-amino-adenosine 5.2 g. (15 mM.) 2-amino-6-bromonebularin, 2.9 g. (16.5 mM.) 2,4-dichlorobenzylamine and 3.0 g. (30 mM.) triethylamine were reacted in 35 ml. isopropanol. Following the working up of the reaction mixture in the usual manner and trituration with ether, there were obtained 5.1 g. (63% of theory) of amorphous N(6)-(2,4-dichlorobenzyl)-2-amino-adenosine, which had a melting point of 80° C.

EXAMPLE 22

N(6)-(4-hydroxy-phenethyl)-2-amino-adenosine 5.2 g. (15 mM.) 2-amino-6-bromonebularin, 2.86 g. (16.5 mM.) tyramine hydrochloride and 3.0 g. (30 mM.) triethylamine were reacted to yield 1.8 g. (29.8% of theory) of amorphous N(6)-(4-hydroxy-phenethyl)-2-amino-adenosine, which had a melting point of 105° C.

EXAMPLE 23

N(6)-(2-phenoxy-benzyl)-2-amino-adenosine 5.2 g. (15 mM.) 2-amino-6-bromonebularin, 3.9 g. (16.6 mol) 2-phenoxy-benzylamine hydrochloride and 3.0 g. (30 mM.) triethylamine were reacted by a procedure analogous to that described in Example 1. After working up and purification over activated charcoal, there were recovered 2.4 g. (34% of theory) N(6)-(2-phenoxy-benzyl)-2-amino-adenosine, which had a melting point of 80° C.

EXAMPLE 24

N(6)-(2-methoxy-benzyl)-2-amino-adenosine 5.3 g. 2-amino-6-bromonebularin, 4.6 g. 2-methoxy-benzylamine and 3.0 g. triethylamine were boiled under reflux for 2 hours in 50 ml. isopropanol. The reaction mixture thereby obtained was evaporated under vacuum, the residue taken up with chloroform and washed twice with water. The chloroform phase was dried and evaporated. Following purification by thin layer chromatography, there were obtained 2.2 g. (37% of theory) N(6)-(2-methoxy-benzyl)-2-amino-adenosine having a melting point of 74° C.

EXAMPLE 25

N(6)-(β-phenethyl)-2-amino-adenosine 5.2 g. (15.0 mM.) 2-amino-6-bromonebularin were reacted with 2.5 g. (16.5 mM.) β-phenethylamine hydrochloride in the conventional manner. After the working up of the reaction mixture, there were obtained 1.4 g. (24% of theory) N(6)-(β-phenethyl)-2-amino-adenosine, which had a melting point of 80° C.

EXAMPLE 26

N(6)-(3,5-dimethoxybenzyl)-2-amino-adenosine 5.2 g. (15.0 mM.) 2-amino-6-bromonebularin were reacted in isopropanol with 2.8 g. (16.75 mM.) 3.5-dimethoxybenzylamine. After working up the reaction mixture in the conventional manner, there were obtained 2.2 g. (34% of theory) N(6)-(3,5-dimethoxy-benzyl)-2-amino-adenosine, which had a melting point of 58° C.

EXAMPLE 27

N(6)-(4-chlorobenzyl)-2-amino-adenosine 6.92 g. ( 20.0 mM.) 2-amino-6-bromonebularin, 3.1 g. (22.0 mM.) 4-chlorobenzylamine and 5.6 ml. (40.0 mM.) triethylamine were boiled under reflux for 5 hours in 50 ml. isopropanol. After cooling, the reaction mixture was further worked up by the method described in Example 1, and after recrystallization from alcohol/ether, there were obtained 2.0 g. (25% of theory) N(6)-(4-chlorobenzyl)-2-amino-adenosine, which had a melting point of 198–200° C.

EXAMPLE 28

N(6)-(2-ethyl-n-hexyl)-2-amino-adenosine

Using a method analogous to that described in Example 27 and starting from 5.2 g. (15.0 mM.) 2-amino-6-bromonebularin and 2.15 g. (16.5 mM.) 2-ethyl-n-hexylamine, there were obtained 1.5 g. (25% of theory) N(6)-(2-ethyl-n-hexyl) - 2 - amino-adenosine, having a melting point of 86–88° C.

EXAMPLE 29

N(6)-(3-fluorobenzyl)-2-amino-adenosine

By the reaction of 5.2 g. (15.0 mM.) 2-amino-6-bromo-nebularin with 2.7 g. 3-fluorobenzylamine, there were obtained 1.8 g. crude N(6)-(3-fluorobenzyl)-2-amino-adenosine which had, after recrylstallization from methanol, yielded 1.1 g. (19% of theory) of pure material, and which had a melting point of 138–139° C.

EXAMPLE 30

N(6)-(2-hydroxy-ethyl)-2-amino-adenosine 5.2 g. (15.0 mM.) 2-amino-6-bromonebularin and 2.8 g. (45.0 mM.) ethanolamine were heated under reflux for 10 hours in 35 ml. isopropanol. After the working up of the reaction mixture, there was obtained an amorphous material. This product was purified by preparative thin layer chromatography by the method described in Example 2 to yield 1.4 g. (30% of theory) N(6)-(2-hydroxy-ethyl)-2-amino-adenosine, which had a melting point of 115° C.

EXAMPLE 31

N(6)-(α-methyl-benzyl)-2-amino-adenosine

By a procedure analogous to that described in Example 19, 6.4 g. 15.0 mM.) 2-amino-6-chloro-2′,3′,5′-tri-O-acetyl-nebularin were reacted with 2.0 g. DL-α-methyl-benzylamine. There were recovered 6.2 g. of a compound which on treatment with methanolic ammonia and subsequent crystallization from methyl ethyl ketone, was converted into 1.1 g. (29% of theory) N(6)-(α-methyl-benzyl)-2-amino-adenosine, which had a melting point of 105° C.

EXAMPLE 32

N(6)-(2-phenyl-cyclohexyl)-2-amino-adenosine

Using a procedure analogous to that described in Example 1, 5.2 g. (15.0 mM.) 2-amino-6-bromonebularin were reacted with 2.65 g. (16.5 mM.) 2-phenyl-cyclohexylamine. After the working up of the reaction mixture, there were obtained 1.5 g. (23% of theory) N(6)-(2-phenyl-cyclohexyl)-2-amino-adenosine which had a melting point of 207° C.

EXAMPLE 33

N(6)-(1-methyl-2-phenoxy-ethyl)-2-amino-adenosine

Following a reaction period of four hours, 5.2 g. (15.0 mM.) 2-amino-6-bromonebularin and 2.3 g. (16.5 mM.) 1-methyl-2-phenoxy-ethylamine yielded 2.0 g. (32% of theory) N(6)-(1 - methyl - 2 - phenoxy-ethyl)-2-amino-adenosine, having a melting point of 95° C.

EXAMPLE 34

N(6)-(2-hydroxy-3-α-naphthoxy-propyl)-2-amino-adenosine 5.2 g. (15.0 mM.) 2-amino-6-bromonebularin were reacted in the conventional manner with 3.6 g. (16.5 mM.) DL-2-hydroxy - 3 - α-naphthoxy-propylamine. After the working up of the reaction mixture, there were obtained 2.6 g. (39% of theory) N(6)-(2-hydroxy-3-α-naphthoxy-propyl)-2-amino-adenosine, which had a melting point of 110° C.

EXAMPLE 35

N(6)-(γ,γ-dimethyl-allyl)-2-amino-adenosine

By the reaction of 5.2 g. (15.0 mM.) 2-amino-6-bromo-nebularin with 2.0 g. (16.5 mM.) γ,γ-dimethyl-allylamine hydrochloride in isopropanol, there were obtained 2.5 g. (47% of theory) N(6)-(γ,γ-dimethyl-allyl)-2-amino-adenosine, which had a melting point of 188–191° C.

EXAMPLE 36

N(6)-[2-(4-nitrophenyl)-2-hydroxy-ethyl]-2-amino-adenosine 4.7 g. (12.0 mM.) 2-amino-6-iodonebularin were heated under reflux for 8 hours with 2.4 g. (13.2 mM.) DL-α-hydroxy-4-nitro-β-phenethylamine in 40 ml. isopropanol, with the addition of 2.5 g. triethylamine. After working up the reaction mixture, there were recovered 2.2 g. (28% of theory) N(6)-[2-(4-nitrophenyl)-2-hydroxy-ethyl]-2-amino-adenosine, which had a melting point of 203–205° C.

EXAMPLE 37

N(6)-(4-methylsulphonamido-benzyl)-2-amino-adenosine 5.2 g. (15.0 mM.) 2-amino-6-bromonebularin and 3.9 g. (16.5 mM.) 4-methylsulphonamino-benzylamine hydrochloride were heated under reflux for 4 hours in 40 ml. isopropanol, with the addition of 6.3 ml. triethylamine. The reaction mixture was then evaporated under vacuum, the residue taken up in water and extracted with ethyl acetate. After drying the extract, the solvent was separated off, the oily residue taken up in coloroform and the solution thereby obtained stirred into 500 ml. dry ether. The precipitated material which formed was filtered off with suction and dried. There were obtained 1.6 g. (23% of theory) of amorphous N(6)-(4-methylsulphonamido-benzyl)-2-amino-adenosine.

EXAMPLE 38

N(6)-(1-hydroxymethyl-n-propyl)-2-amino-adenosine

By the reaction of 5.2 g. (15.0 mM.) 2-amino-6-bromonebularin with 1.5 g. (16.8 mM.) DL-α-amino-n-butanol, using a procedure analogous to that described in Example 37, there were obtained 1.1 g. (21% of theory) of amorphous N(6)-(1-hydroxymethyl-n-propyl)-2-amino-adenosine.

The symbols "L" and "D" used hereinbefore are intended to denote laevo- and dextro-rotary isomers, but without indicating the absolute configuration of the isomers.

In order to establish the effectiveness of the compounds in accordance with the invention as therapeutic agents exerting an effect on the cardiac and circulatory systems, the applicants carried out a series of tests, the details and significance of which are set out hereinafter.

Adenosine on intravenous administration in mammals and humans produces a vaso-dilatation. In particular this effect is noticeable in the coronary vascular system wherein a marked increase in blood circulation results from the vaso-dilatation produced by administration of adenosine (Berne, Blackmon and Gardner, J. Clin. Invest. 36, 1101 [1957]). However, due to the rapid deamination of adenosine, this effect is only transient. The 2-amino-N(6)-substituted derivatives of adenosine in accordance with the invention have been found to exert a marked vasodilating effect of high coronary specificity but in contrast to adenosine, the effect is a prolonged one. In order to compare the effectiveness of the novel 2-amino-N(6)-substituted adenosine derivatives, on the coronary blood circulation, the applicants have selected 2-amino-N(6)-methyl adenosine which has been described in the literature [Naito, Ueno and Ishikawa, Chem. Pharmaceutical Bulletin 12, 951 (1964)] as the comparison compound.

An increased blood circulation in the coronary system, provided that there are no significant changes in the myocardial oxygen consumption, results in a reciprocal decrease of the coronary arteriovenous oxygen difference. This decrease in extraction of oxygen from the blood leads to an additional supply of oxygen and namely, that an improvement in the oxygen supply to the myocardium which is the ultimate aim sought to be achieved with all coronary dilating agents.

For the purpose of obtaining an exact basis for evaluating the results of the procedures involved, the decrease in cornary arteriovenous oxygen difference (at the time of the maximum effect) has been reported in volume percent in the table as compared to the starting value. The greater the value reported the more significant was the coronary oxygen supply increase.

The procedures were carried out using 70 alert unanesthetized dogs, each weighing between 12 and 16 kg. The procedure of Rayford, Huvos and Gregg, Proc. Soc. Exp. Biol. Med. 113, 876 [1963], were followed, catheters having been implanted surgically into the Sinus coronarius, the aorta and the vena cava of the animals. It was thus made possible to photometrically determine the coronary arteriovenous saturation difference (Brinkman, Arch. Chir. Neerl. 1, 177 [1949]) and from the actual hemoglobin values obtained to convert the values into the corresponding volume percents. The compounds were administered intravenously in the amounts indicated in 1 ml. of a 5% LUTROL-9-solution (liquid polyethylene oxide, molecular weight about 400, BASF-Ludwigshafen) in 5.5 percent aqueous glucose.

The following compounds were employed in the experimental procedures:

(A) 2-amino-N(6)-methyl adenosine
(B) N(6)-benzyl-2-amino-adenosine
(C) N(6)-n-propyl-2-amino-adenosine
(D) N(6)-(L-β-phenylpropyl)-2-amino-adenosine
(E) N(6)-(2-methoxy-benzyl)-2-amino-adenosine
(F) N(6)-(2-chlorobenzyl)-2-amino-adenosine
(G) N(6)-isobutyl-2-amino-adenosine
(H) N(6)-(2-methylbenzyl)-2-amino-adenosine
(I) N(6)-(2-hydroxy-3-m-cresoxy-propyl)-2-amino-adenosine
(J) N(6)-(β-phenethyl)-2-amino-adenosine
(K) N(6)-(2-trifluoromethyl-benzyl)-2-amino-adenosine
(L) N(6)-(3,5-dimethoxybenzyl)-2-amino-adenosine
(M) N(6)-(2-phenyl-cyclopropyl)-2-amino-adenosine
(N) N(6)-furfuryl-2-amino-adenosine
(O) N(6)-(3,4-dimethoxy-β-phenethyl)-2-amino-adenosine
(P) N(6)-(α-methyl-β-hydroxy-β-phenethyl)-2-amino-adenosine
(Q) N(6)-(α-carboxy-benzyl)-2-amino-adenosine
(R) N(6)-allyl-2-amino-adenosine
(S) N(6)-(4-chlorobenzyl)-2-amino-adenosine
(T) N(6)-(2-thyl-n-hexyl)-2-amino-adenosine
(U) N(6)-cyclohexyl-2-amino-adenosine
(V) N(6)-benzhydryl-2-amino-adenosine
(W) N(6)-(1-adamantyl)-2-amino-adenosine
(X) N(6)-(2,4-dichlorobenzyl)-2-amino-adenosine
(Y) N(6)-(2-β-indolyl-ethyl)-2-amino-adenosine
(Z) N(6)-(4-hydroxy-phenethyl)-2-amino-adenosine
(AA) N(6)-(2-indanyl)-2-amino-adenosine
(BB) N(6)-(3-fluorobenzyl)-2-amino-adenosine (CC) N(6)-(2-hydroxyethyl)-2-amino-adenosine
(DD) N(6)-(2-phenoxy-benzyl)-2-amino-adenosine
(EE) N(6)-(α-methylbenzyl)-2-amino-adenosine
(FF) N(6)-(2-phenylcyclohexyl)-2-amino-adenosine
(GG) N(6)-(1-methyl-2-phenoxy-ethyl)-2-amino-adenosine
(HH) N(6)-(2-hydroxy-3-α-naphthoxy-propyl)-2-amino-adenosine
(II) N(6)-(γ,γ-dimethylallyl)-2-amino-adenosine
(JJ) N(6)-n-butyl-2-amino-adenosine
(KK) N(6)-[2-(4-nitrophenyl)-2-hydroxy-ethyl]-2-amino-adenosine
(LL) N(6)-(4-methylsulfonamino-benzyl)-2-amino-adenosine
(MM) N(6)-(1-hydroxymethyl-n-propyl)-2-amino-adenosine The results of the experimental procedures are set out in the following table:

TABLE.—IMPROVEMENT IN THE CORONARY OXYGEN SUPPLY MEASURED ON THE BASIS OF THE A.V. DO₂ DIFFERENCE

| Compound: | Doses, mg./kg. i.v. | Decrease of the coronary O₂ depletion [1] |
|---|---|---|
| A | 0.4 | 0.2 |
| B | 0.4 | 1.9 |
| C | 0.4 | 1.3 |
| D | 0.4 | 8.1 |
| E | 0.4 | 1.8 |
| F | 0.4 | 6.9 |
| G | 0.4 | 2.4 |
| H | 0.4 | 5.4 |
| I | 0.4 | 1.4 |
| J | 0.4 | 2.0 |
| K | 0.4 | 10.1 |
| L | 0.4 | 5.8 |
| M | 0.4 | 1.6 |
| N | 0.4 | 3.0 |
| O | 0.4 | 3.2 |
| P | 0.4 | 6.1 |
| Q | 0.4 | 1.0 |
| R | 0.4 | 2.7 |
| S | 0.4 | 2.2 |
| T | 0.4 | 3.2 |
| U | 0.4 | 4.5 |
| V | 0.4 | 0.9 |
| W | 0.4 | 0.6 |
| X | 0.4 | 3.6 |
| Y | 0.4 | 2.2 |
| Z | 0.4 | 4.1 |
| AA | 0.4 | 1.3 |
| BB | 0.4 | 4.0 |
| CC | 0.2 | 1.2 |
| DD | 0.4 | 1.5 |
| EE | 0.4 | 2.6 |
| FF | 0.4 | 3.0 |
| GG | 0.2 | 1.7 |
| HH | 0.4 | 1.5 |
| II | 0.4 | 2.2 |
| JJ | 0.4 | 3.0 |
| KK | 0.2 | 0.3 |
| KK | 0.4 | 0.8 |
| LL | 0.2 | 0.8 |
| LL | 0.4 | 2.7 |
| MM | 0.2 | 0.5 |
| MM | 0.4 | 1.7 |

[1] In volume percent as compared to the controls at maximum effect.

From the table, it can be seen that the compounds in accordance with the invention constitute highly valuable therapeutic agents having marked coronary dilating properties in contrast to the known compound which is substantially ineffective in a dosage range of 0.4 mg./kg. in the dog.

As previously indicated, the adenosine derivatives of this invention are readily adapted to therapeutic use as cardio and ciriculatory agents. The toxicity of the compounds of the invention has been found to be quite low or substantially non-existent when they are administered in amounts that are sufficient to achieve the desired therapeutic effects. Moreover, no other pharmacological side effects have been observed to occur as a result of their administration.

In accordance with the method of treatment of the present invention, the compounds can be given via the oral route. However, the compounds can also be administered as parenterals in the form of their solutions or suspensions. The compounds can be administered either alone and/or preferably in combination with a pharmaceutically acceptable carrier, and such administration can be carried out in both single and multiple dosages. More particularly, the compounds of this invention can be administered in a wide variety of different dosage forms wherein they are combined with various pharmaceutically acceptable inert carriers in the form of tablets, capsules, dragees, powders, aqueous suspensions, solutions, and the like. Such carriers include solid diluents or fillers, liquid aqueous media and various non-toxic organic solvents, etc. In general, the therapeutically effective compounds are present in such dosage forms at concentration levels ranging from about 0.01 to about 90% by weight of the total composition, i.e., in amounts which are sufficient to provide the desired unit dosage.

In dosage unit form, the compounds as set out herein are used in amounts of from 0.1–50 mg., preferably 0.5–10 mg., active ingredient per dosage unit. Preferably, the compositions are compounded so that for parenteral administration, 0.5–5 mg. of active compound/dosage unit is present and for oral administration 2–10 mg. of compound/dosage unit.

We claim:
1. A 2-amino-adenosine derivative of the formula

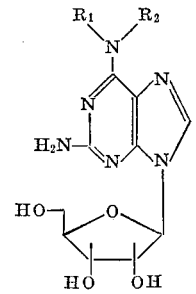

wherein $R_1$ is a member selected from the group consisting of hydrogen, substituted and unsubstituted, saturated and unsaturated, aliphatic lower hydrocarbon radicals, wherein said substituent is at least one member selected from the group consisting of amino-, lower alkylamino, di-lower alkylamino, lower alkanoylamino, lower alkoxy, lower alkanoyloxy, hydroxy, mercapto, lower alkylmercapto, carboxy, carboxy-lower alkyl and carboxamido, and $R_2$ is a member selected from the group consisting of saturated and unsaturated cycloalkyl radicals containing 3 to 6 carbon atoms and the group A—X—B, wherein said cycloalkyl radicals can carry a member selected from the group consisting of endoalkylene radicals containing up to 4 carbon atoms and annelated saturated and unsaturated cyclic hydrocarbon radicals containing 5 to 7 carbon atoms and in said group A—X—B, A is a member selected from the group consisting of substituted and unsubstituted, saturated and unsaturated, straight chained and branched lower aliphatic radicals and cyclic aliphatic radicals containing 3 to 6 carbon atoms, wherein said substituent is a member selected from the group consisting of hydroxy, lower alkanoyloxy, carboxy and phenyl radicals, X is a valency bond or a member selected from the group consisting of oxygen, sulfur, lower alkylimino and lower alkanoylimino and B is a member selected from the group consisting of substituted and unsubstituted lower alkyl, lower alkenyl, mono and bicycloaryl, furyl, pyridyl, indolyl and imidazolyl, wherein said substituent is at least one member selected from the group of halogen, lower alkyl, lower haloalkyl, lower alkoxy, mono and bicycloaryloxy, lower alkanoyloxy, hydroxy, mercapto, lower alkylmercapto, nitro, carboxy, lower carboxyalkyl and methylsulfonylamino.

2. A 2-amino-adenosine derivative according to claim 1 designated N(6) - (L - $\beta$ - phenylpropyl) - 2 - amino-adenosine.

3. A 2-amino-adenosine derivative according to claim 1 designated N(6) - (2 - chlorobenzyl) - 2 - amino-adenosine.

4. A 2-amino-adenosine derivative according to claim 1 designated N(6) - (2 - methylbenzyl) - 2 - amino-adenosine.

5. A 2-amino-adenosine derivative according to claim 1 designated N(6) - (2 - trifluoromethyl - benzyl) - 2 - amino-adenosine.

6. A 2-amino-adenosine derivative according to claim 1 designated N(6)-(3,5 - dimethoxybenzyl) - 2 - amino-adenosine.

7. A 2-amino-adenosine derivative according to claim 1 designated N(6) - ($\alpha$ - methyl - $\beta$ - hydroxy - $\beta$ - phenethyl)-2-amino-adenosine.

References Cited
UNITED STATES PATENTS

| | | | |
|---|---|---|---|
| 3,014,900 | 12/1961 | Schroeder | 260—211.5 |
| 3,208,997 | 9/1965 | Iwai et al. | 260—211.5 |
| 3,225,029 | 12/1965 | Yamoka | 260—211.5 |

ELBERT L. ROBERTS, Primary Examiner

J. R. BROWN, Assistant Examiner

U.S. Cl. X.R.

424—180

PO-1050
(5/69)

UNITED STATES PATENT OFFICE
CERTIFICATE OF CORRECTION

Patent No. 3,590,029          Dated June 29, 1971

Inventor(s) Klaus Koch, et al

It is certified that error appears in the above-identified patent and that said Letters Patent are hereby corrected as shown below:

Col. 4, line 14 --- "triethylamino" should be ----- triethylamine---

Col. 4, line 56 --- "5777%" should be --57%--

Col. 5, line 11 --- "prfocedure" should be -- procedure--

Col. 10, line 21 --- "procedues" should be -- procedures---

Col. 10, line 67 --- "thyl" should be --ethyl--

Signed and sealed this 14th day of March 1972.

(SEAL)
Attest:

EDWARD M. FLETCHER, JR.
Attesting Officer

ROBERT GOTTSCHALK
Commissioner of Patents